US006570152B1

(12) United States Patent
Hoyes

(10) Patent No.: US 6,570,152 B1
(45) Date of Patent: May 27, 2003

(54) TIME OF FLIGHT MASS SPECTROMETER WITH SELECTABLE DRIFT LENGTH

(75) Inventor: John Brian Hoyes, Stockport (GB)

(73) Assignee: Micromass Limited, Manchester (GB)

( * ) Notice: Subject to any disclaimer, the term of this patent is extended or adjusted under 35 U.S.C. 154(b) by 484 days.

(21) Appl. No.: 09/594,022

(22) Filed: Jun. 15, 2000

(30) Foreign Application Priority Data

Mar. 3, 2000 (GB) ............................................ 0005125
Jun. 8, 2000 (GB) ............................................ 0013931

(51) Int. Cl.[7] ................................................ B01D 59/44

(52) U.S. Cl. ....................... 250/287; 250/281; 250/282; 250/396 R; 250/286; 250/288

(58) Field of Search ................................ 250/281, 282, 250/283, 286, 288, 291, 294, 295, 297, 298, 299, 396 R

(56) References Cited

U.S. PATENT DOCUMENTS

| | | | | |
|---|---|---|---|---|
| 5,202,563 A | | 4/1993 | Cotter et al. | |
| 5,401,962 A | | 3/1995 | Ferran | |
| 5,880,466 A | | 3/1999 | Benner | |
| 6,013,913 A | | 1/2000 | Hanson | |
| 6,300,625 B1 | * | 10/2001 | Ishihara | 250/287 |

FOREIGN PATENT DOCUMENTS

| | | |
|---|---|---|
| DE | 4408489 | 9/1995 |
| GB | 2080021 | 1/1982 |
| GB | 2233149 | 1/1991 |
| RU | 1725289 | 4/1992 |
| WO | WO 89/06044 | 6/1989 |
| WO | WO 92/21140 | 11/1992 |

OTHER PUBLICATIONS

Wiley, et al., "Time–of–Flight Mass Spectrometer with Improved Resolution", The Review of Scientific Instruments, vol. 26, No. 12, pp. 1150–1157, 1955.

Mamyrin et al., "The Mass–Reflection, a New Nonmagnetic Time–of–Flight Mass Spectrometer with High Resolution", Sov. Phys. JETP, vol. 37, No. 1, pp. 45–48, 1973.

(List continued on next page.)

*Primary Examiner*—John R. Lee
*Assistant Examiner*—David A. Vanore
(74) *Attorney, Agent, or Firm*—Diederiks & Whitelaw, PLC

(57) ABSTRACT

A time of flight mass analyzer having a drift region, an ion package generator, first and second ion reflectors and at least one ion detector. The drift region has an axis, an entrance and an exit and provides for a place wherein ions may be temporarily separated according to their mass-to-charge ratios. The ion package generator injects packets of ions into the drift region at the region's entrance from a beam of ions by intermittently applying an electrostatic field such that the packets of ions enter the drift region in an initial direction which is inclined to the direction of said beam of ions. The first ion reflector is disposed at the exit of the drift region to reflect, back towards the entrance, ions which are traveling towards the reflector in the drift region. The second ion reflector is disposed in juxtaposition to the first ion reflector to reflect packets of ions back towards the first ion reflector through at least a portion of the drift region so that the packet of ions may be reflected to and fro between said first and second ion reflectors and undergo a number n of reflections at the second ion reflector. A detector is disposed to detect at least some packets of ions reflected by the first ion reflector which do not enter the second ion reflector. The number of reflections at the second ion reflector may be selected by adjustment of an inclination of the initial direction to the axis.

32 Claims, 4 Drawing Sheets

OTHER PUBLICATIONS

Bergmann et al., "High–Resolution Time–of–Flight Mass Spectrometer", Rev. Sci. Instrum., vol. 60, No. 4, pp. 792–793, 1989.

Dawson et al., "Orthogonal–Acceleration Time–of–Flight Mass Spectrometer", Rapid Communications in Mass Spectrometry, vol. 3, No. 5, pp. 155–159, 1989.

Bergmann et al., "High–Resolution Time–of–Flight Mass Spectrometers. Part II Cross Beam Ion Optics", American Institute of Physics, pp. 2584–2591, 1990.

Wollnik et al., "Time–of–Flight Mass Spectrometers with Multiply Reflected Ion Trajectories", International Journal of Mass Spectrometry and Ion Processes, vol. 96, pp. 267–274, 1990.

Chen et al., "The Transmission of the Multiple Reflection Type Time–of–Flight Mass Spectrometer", Institute of Nuclear Science, National Ting Hau University, vol. 28(3), pp. 183–186, 1991.

Coles et al., "Orthogonal Acceleration—A New Direction for Time–of–Flight Mass Spectrometry: Fast, Sensitive Mass Analysis for Continuous Ion Sources", Trends in Analytical Chemistry, vol. 12, No. 5, pp. 203–213, 1993.

Cornish et al., "A Dual–Reflection Tandem Time–of–Flight Mass Spectrometer", American Chemical Society, Chapter 6, pp. 93–107, 1994.

Balsinger et al., "Rosetta Orbiter Spectrometer for Ion and Neutral Analysis–Rosina", Adv. Space Res., vol. 21, No. 11, pp. 1527–1534, 1998.

Scherer et al., "Prototype of a Reflectron Time–of–Flight Mass Spectrometer for the Rosetta Comet Rendezvous Mission", The $46^{th}$ ASMS Conference on Mass Spectrometry and Allied Topics, May 31–Jun. 4, 1998.

Hohl et al., "Mass Selective Blanking in a Compact Multiple Reflection Time–of–Flight Mass Spectrometer", International Journal of Mass Spectrometry, vol. 188, pp. 189–197, 1999.

Piyadasa et al., "A High Resolving Power Multiple Reflection Matrix–Assisted Laser Desorption/Ionization Time–of –Flight Mass Spectrometer", Rapid Communications in Mass Spectrometry, vol. 13, pp. 620–624, 1999.

Brubaker et al., Abstract on "Operation of Quadrupole Mass Filter at High Pressure", Earth Sciences, A Teledyne Company, Appendix II.

* cited by examiner

TIME OF FLIGHT MASS SPECTROMETER WITH SELECTABLE DRIFT LENGTH

BACKGROUND OF THE INVENTION

1. Field of the Invention

This invention relates to time-of-flight mass spectrometers that incorporate an ion mirror or reflector to increase the effective length of the drift region focusing. More particularly it relates to such spectrometers having more than one ion reflector and in which the number of reflections undergone by the ion packets can be varied to adjust the resolution of the spectrometer.

2. Discussion of the Prior Art

In a time-of-flight-mass spectrometer, mass-to-charge ratio of an ion is determined by accelerating it through to a given energy by means of an electrostatic field and measuring its subsequent flight time through a field-free drift region. The mass resolution of such a spectrometer is obviously dependent on the length of the drift region, because increasing its length will increase the separation in time between ions of adjacent mass-to-charge ratios. However, drift region length is in practice limited by the physical size of the spectrometer and certain observations, discussed below, limit the maximum resolution obtainable, irrespective of the drift region length. The two most important aberrations arise from:

1) variations in the position in the accelerating field at which the ion is generated; and
2) variations in the velocity imparted to the ion during its creation.

The first of these aberrations may be at least in part corrected by the space focusing technique, first taught by Wiley and McLaren in Rev. Sci. Instrum. 1955 vol 26 (12) pp 1150–1157, and in many subsequent papers and patents. The second aberration requires to be corrected by velocity focusing. The technique known as delayed extraction, also first suggested by Wiley and McLaren (ibid.) is a commonly used method of providing some degree of velocity focusing.

Another way of reducing the effect of different initial ion velocities is to provide an ion reflector at the end of the drift region to reflect the ions back towards the source through the drift region to a detector located close to the source. (See, for example, Mamyrin, Karatev et al, Sov. Phys. JETP, 1973, vol 37 (1) pp 45–48). Ions that leave the source region with a high velocity in the direction of the drift region will penetrate further into the ion reflector before being turned around than will ions of a lower initial velocity.

Consequently, ions with high initial velocity will travel a greater distance between the source and the detector than will ions of lower initial velocity. It is therefore possible to arrange the instrumental parameters so that the "initially fast" and the "initially slow" ions arrive at the detector at the same time.

Another advantage that results from the use of a reflecting analyser is that the distance travelled by the ions in the drift region is approximately double that it would be in a linear analyser of the same physical size, which results in improved resolution.

By the provision of multiple reflectors, it is possible to reduce the physical size of a reflection time-of-flight mass spectrometer still further merely by reflecting the ion packets backwards and forwards along a short drift region. However, each reflection results in a transmission loss (typically between 10% and 50%), and mass peaks tend to be broadened (and therefore reduced in intensity) as the path length is increased.

Several different versions of prior multiple-reflection time-of-flight mass spectrometers are known. That described by Chen and Su in Hezi Kexue (Nucl. Sci. J) 1991, vol 28 (3) pp 183–189 is a spectrometer having two parallel ion mirrors which reflect the ion packets a fixed number of times before they pass beyond the edge of one mirror to be received by an ion detector.

The spectrometers described in DE4418489, and U.S. Pat. No. 5,880,466 are essentially ion traps in which a packet of ions is repeatedly reflected between two parallel ion mirrors and does not enter a conventional ion detector. Instead, the oscillating ion packet is caused to induce a signal in sensing electrodes, which signal can be measured and processed by suitable electronic data processing equipment. GB 2080021 discloses in its FIG. 6 embodiment a multiple reflection time-of-flight mass spectrometer comprising an ion mirror that can be electronically tilted to reflect the incoming ion packets at different angles. At one such angle, the reflected packets pass into an ion detector, thereby enabling a moderate resolution spectrum to be recorded. At another such angle the reflected packets are directed to a second ion mirror and then to another ion detector, thereby providing increased path length and enabling a higher resolution spectrum to be recorded at lower sensitivity.

Multiple-reflection time-of-flight mass spectrometers incorporating switchable ion mirrors are taught by Wollnik and Przewloka in Int. J. Mass Spectrorn. and Ion Proc. 1990 vol 96 pp 267–274. The potentials applied to these mirrors can be switched off so that instead of being reflected, ion packets merely pass through the mirror undeflected, typically to an ion detector. Various configurations may be used in conjunction with suitable electronic timing and control circuiting to provide spectrometers with different path lengths.

Soviet Inventors Certificate SU 1725289 teaches a multiple-reflection spectrometer in which the ion source and the detector can be physically moved along an axis midway between the two reflectors. The distance between the source and detector controls the number of reflections of the ion packets and hence the resolution of the spectrometer. Piyadasa, Hakansson et. al. in Rapid Comm. in Mass Spectrom, 1999 vol 13 pp 620–624 describe a multiple reflection time-of-flight mass spectrometer in which two parallel ion mirrors are used to trap the ions, in a manner similar to that taught in U.S. Pat. No. 5,880,466. However, Piyadasa detects the ions by switching off one of the mirrors after a predetermined time to allow the ion packets to pass through the mirror and impact on a conventional ion detector. In this device, the number of ion reflections may be varied by adjustment of the time interval between the generation of an ion packet and the moment the ion mirror is switched off.

Hohl, Wurz, Scherer et.al. in Int. J. Mass Spectrom. 1999 vol 188 pp189–197 describe an instrument comprising two ion mirrors, the second of which is disposed between the ion source and the detector. In the "triple reflection" mode, ion packets pass from the source to the first mirror where they are reflected towards the second mirror. The second mirror returns them to the first mirror, which in turn reflects them to the ion detector. An electrostatic lens is located at the entrance of the first mirror. When a relatively low potential is applied to this lens, the spectrometer operates in a single-reflection mode wherein ion packets entering the first ion mirror are reflected directly into the ion detector. A higher potential applied to the lens results in the reflected ion packets being reflected by the second mirror so that the spectrometer operates in the triple reflection mode. These prior switchable mode spectrometers all require additional components such as lenses, power supplies and/or ion detectors.

SUMMARY OF THE INVENTION

It is an object of the present invention to provide a switchable mode multi-reflection time-of-flight mass spectrometer which is capable of at least first order velocity focusing in both single and multi-reflection modes and which requires fewer additional components than prior types. It is another object of the present invention to provide a time-of-flight mass analyzer having variable resolution into which ions are orthogonally injected. It is a further objective to provide a reflecting time-of-flight mass analyzer having orthogonal ion injection in which the resolution may be selected by varying the number of reflections undergone by the ions. Another objective is to provide such a time-of-flight mass analyzer in which the number of reflections can be changed more easily than is possible with prior multiple-reflection spectrometers. Other objectives are to provide mass spectrometers and tandem mass spectrometers comprising such time-of-flight mass analyzers. Another objective is to provide methods of changing the number of reflections in a time-of-flight mass analyzer having orthogonal ion injection, which are simpler and more easily implemented than prior methods. Further objectives are to provide methods of changing the resolution of a time-of-flight mass analyzer having orthogonal ion injection or of a mass spectrometer incorporating such an analyzer, which are simpler and more easily implemented than prior methods.

In accordance with these objectives the invention provides a time-of-flight mass analyzer comprising:

1) a drift region while travelling through which ions may be temporally separated according to their mass-to-charge ratios, said drift region having an axis, an entrance and an exit;
2) an ion packet generator for injecting packets of ions into said drift region at said entrance from a beam of ions by the intermittent application of an electrostatic field such that said packets of ions enter said drift region in an initial direction which is inclined to the direction of said beam of ions;
3) a first ion reflector disposed at said exit to reflect back towards said entrance ions which are travelling towards it in said drift region;
4) a second ion reflector disposed in juxtaposition to said first ion reflector to reflect those of said packets of ions which enter it back towards said first ion reflector through at least a portion of said drift region, so that packets of ions may be reflected to and fro between said first and said second ion reflectors and undergo a number n of reflections at said second ion reflector;
5) at least one ion detector disposed to detect at least some packets of ions reflected by said first ion reflector which do not enter said second ion reflector;

said time-of-flight analyzer characterized in that the number n of reflections at said second ion reflector is selected by adjustment of the inclination of said initial direction to said axis. In a preferred embodiment, the ion detector is disposed in a common plane with the ion packet generator at the entrance to the drift region. Preferably, this plane is perpendicular to the axis of the drift region. In still further preferred embodiments, the second ion reflector is disposed between the ion detector and the ion packet generator in another plane which is also perpendicular to the axis of the drift region. Most preferably, the two planes are coincident.

In a time-of-flight analyzer according to the invention, the length of the path travelled by the packets of ions from the ion packet generator to the ion detector is determined by the value of n. If n is zero, the analyzer functions as a conventional reflectron analyzer in which ion packets are generated by the ion packet generator and travel through the drift region to the first ion reflector. The first ion reflector then reflects them back through the drift region into the ion detector. An analyzer according to the invention may operate in this mode if the inclination of the initial direction to the drift region axis is such that the ions reflected by the first ion reflector do not enter the second ion reflector, but instead pass directly into the ion detector.

If, however, the inclination of the initial direction to the drift region axis is such that n=1 then ions leaving the ion packet generator travel through the drift region to the first ion reflector where they are reflected back through at least a portion of the drift region and enter the second ion reflector. This returns them to the first ion reflector, which in turn reflects them back through the drift region. By the time they reach the entrance of the drift region, however, their displacement from the drift region axis is now greater than it was after the first reflection at the first ion reflector so that they now enter the ion detector instead of the second ion reflector. (This mode of operation is described in greater detail below). When n=1, therefore, each packet of ions makes four passes through the drift region, in contrast to the conventional mode (n=0), in which they make only two. Consequently, a higher mass resolution can be achieved in the n=1 mode than in the n=0 mode because the distance travelled by the ions is twice as great. Unfortunately the increase in resolution is accompanied by a loss in sensitivity, however, because each reflection results in some loss of ions, sometimes as much as 50%.

It is also possible to operate an analyzer according to the invention with values of n=2 or higher. This is done by using lower angles of inclination between the initial direction and the drift region axis so that six (n=2) or more passes through the drift region are necessary before the displacement of the ion packets from the axis becomes sufficiently great for them to miss the second ion reflector and instead enter the ion detector. Each increase in the number of passes results in a higher mass resolution but with a further loss in sensitivity, as explained.

Preferred embodiments of the invention therefore comprise a time-of-flight analyzer which has at least two of these modes of operation, corresponding to at least a low resolution/high sensitivity mode and a high resolution/low sensitivity mode. (ie, a mode with a zero or low value of n, and a mode with a higher value of n). Means are provided for selecting the modes by changing the inclination of the initial direction at which the ions enter the drift region relative to its axis.

In a most preferred embodiment, the injection of ions into the drift region is done by intermittently applying an electrostatic field approximately orthogonally to the direction of travel of the beam of ions travelling through the ion packet generator, as in a conventional orthogonal acceleration time-of-flight mass analyser. Application of this field ejects a packet of ions comprising a segment of the ion beam into the drift region in an initial direction which is the resultant of the orthogonal velocity imparted to the ions by the field and their original transverse velocity through the ion packet generator. The orthogonal component of velocity is typically much greater than their original velocity so that the packet of ions leaves the ion packet generator in the approximate direction of the axis of the drift region, as in a prior orthogonal time-of-flight analyzer. As explained, the initial direction of travel in the drift region and the axis of the drift region determines the mode of operation of the analyzer. A high angle of inclination between the actual initial direction and the axis of the drift region results in a low (or zero) value of n, while a low angle gives a higher value of n. It will be appreciated that the initial direction, and consequently the value of n with which the time-of-flight analyzer operates, is determined by the ratio of the initial velocity of the ions as they enter the ion packet generator to the orthogonal velocity imparted to them in the ion packet generator. Further, because the velocity v of an ion is given by $$v=\sqrt{\frac{2E}{m}} \tag{1}$$

where E is the kinetic energy of the ion and m is its mass, the ratio of the kinetic energies E, resolved into directions corresponding to the two components of velocity, also determines the angle at which the ion packets enter the drift region. In preferred embodiments, therefore, a desired mode of operation is selected by setting the ratio of the initial energy at which the ions enter the ion packet generator to the orthogonal energy imparted to the ions by the ion packet generator to the value which results in the desired value of n.

Although the mass of the ion appears in equation (1), it cancels from the expression for the ratio, so that the angle of entry into the drift region is independent of the mass of the ion.

In still further preferred embodiments, the energy of the ions entering the ion packet generator is controlled by accelerating the ions through a potential gradient as they approach the ion packet generator so that they enter it with an energy equal to the sum of their starting energy and the energy they acquire on travelling through the gradient. For the best results, therefore, the starting energy of each of the ions entering the ion packet generator must be similar. This is most conveniently achieved by use of an ion energy-collimating device upstream of the ion packet generator. Such devices include (without limitation thereto) a collisional-focusing gas cell and an electrostatic energy filter. A collisional-focusing gas cell causes the ions passing through it to repeatedly collide with molecules of an inert gas in the cell so that they emerge with a kinetic energy approximately equal to that of the thermal energy of the neutral gas molecules, irrespective of their original kinetic energy. Such devices are well known in the art, and are described, for example, in U.S. Pat. No. 4,963,736. Typically they may comprise a multipole electrode set to which radio frequency potentials are applied to confine the ions to the vicinity of the cell axis, and into which an inert gas at a pressure of about $10^{-2}$ torr is introduced. Such a cell produces a beam of ions which comprises ions having approximately the same kinetic energy (usually less than about 3eV) and which are all travelling in the same direction. A preferred embodiment of the invention may therefore comprise a mass spectrometer which has an ion source, a collisional-focusing gas cell for collimating the ions generated by the source, equalizing their kinetic energies and transmitting them to a time-of-flight mass analyzer of the type previously described. In yet another embodiment the invention may comprise a tandem mass spectrometer which has an ion source, a first mass filter for transmitting ions having mass-to-charge ratios in a predetermined range, a collisional-focusing gas cell for receiving ions transmitted by said first mass filter, fragmenting them by collisions with neutral molecules of gas, collimating said fragment ions, equalizing their kinetic energies and transmitting them to a time-of-flight mass analyzer of the type previously described. Typically, the first mass analyzer will comprise a linear quadrupole mass filter or a quadrupole ion trap. It is also within the scope of the invention to combine the gas cell with the first mass analyzer, particularly in the case of a quadrupole ion trap.

It will be appreciated that in all these practical embodiments of the invention, the mode of operation of the time-of-flight analyzer (ie, the value of n) can be changed merely by adjusting the value of the potential gradient through which the ions are accelerated as they approach the ion packet generator. This is much simpler way of changing the number of reflections in a multiple reflection time-of-flight analyzer than is taught by any of the prior art discussed above.

Viewed from another aspect the invention provides a method of determining the mass-to-charge ratio of ions travelling in a beam by measuring their time of flight through a drift region having an axis, an entrance and an exit, there being also provided a first ion reflector disposed at said exit and a second ion reflector disposed in juxtaposition to said first ion reflector to reflect those packets of ions which enter it back through at least a portion of said drift region; said method comprising sequentially executing the following steps:

1) intermittently applying an electrostatic field to ions in said beam to inject packets of ions into said drift region at said entrance in an initial direction inclined to their original direction of travel in said beam;
2) when they reach said exit, reflecting ions comprised in said packets back into the said drift region towards said entrance by means of a first ion reflector;
3) by means of said second ion reflector, reflecting back towards said first ion reflector those of said packets of ions which enter said second ion reflector so that those packets of ions may be reflected to and fro between said first ion reflector and said second ion reflector and undergo an number n of reflections at said second ion reflector;
4) by means of an ion detector, detecting at least some packets of ions which have been reflected by said first ion reflector but which do not enter said second ion reflector; said method characterized in that the number n of reflections undergone by a said packet of ions at said second ion reflector before it is detected is determined by adjusting the inclination of said initial direction to said axis.

In preferred methods the number n of reflections at the second ion reflector may typically be chosen from the values n=0 through to n=2, but higher values may also be used. The significance of the different values of n has already been described. Thus in preferred methods, the mass-to-charge ratios of the ions to be analysed may be determined at high sensitivity and relatively low resolution by using a low value of n (preferably n=0, which corresponds to the conventional reflectron mode of operation of the analyzer), or alternatively with higher mass resolution with lower sensitivity using a value of n=1 or n=2.

The invention provides a simple and convenient method of changing between these modes, merely by adjusting the angle of inclination between the initial direction at which the ions enter the drift region and the axis of the drift region. As explained, the initial direction in which the ions are injected into the drift region, and therefore the value of n, is dependent on the ratio of the energy imparted by the electrostatic field to the ions in the beam to inject packets of ions into the drift region and the original energy they possessed while travelling in the beam. In preferred methods according to the invention, therefore, a desired mode of operation is selected by setting the ratio of the initial energy of the ions in the beam from which the ion packets are ejected to the energy imparted to them by the electrostatic field to the value which results in the desired value of n. Preferably, the electrostatic field is arranged to eject the ion packets from the beam in a substantially orthogonal direction.

In still further preferred methods, the energy of ions in the beam is controlled by accelerating them through a potential gradient before the electrostatic field is applied to eject packets of ions into the drift region. The desired value of n may then be selected simply by adjusting the potential difference through which the ions are accelerated. Preferably, in methods according to the invention, the ions are passed through an ion energy-collimating device before they are accelerated by the potential gradient. Such devices include (without limitation thereto) a collisional-focusing gas cell and an electrostatic energy filter. This ensures that the ions have substantially the same energy at the moment that they are injected into the drift region, so that the initial direction in the drift region is the same for all ions in any given packet of ions.

The invention further provides a method of mass spectrometry comprising generating a beam of ions whose mass-to-charge ratios are to be determined, passing said beam through a collisional-focusing gas cell in order to collimate the ions and to equalize their translational energies, and determining their mass-to-charge ratios by measuring their time of flight through a drift region in the manner described above. The invention further provides a method of tandem mass spectrometry comprising generating a beam of ions, passing said ions through a first mass filter to transmit only those ions having mass-to-charge ratios in a predetermined range, fragmenting at least some of those ions by collisions with molecules of inert gas, collimating the fragment ions and equalizing their translational energies, and determining the mass-to-charge ratios of the fragment ions by measuring their time of flight through a drift region in the manner described above.

BRIEF DESCRIPTION OF THE DRAWINGS

A preferred embodiment of the invention will now be described by reference to the figures, in which.

DETAILED DESCRIPTION OF THE PREFERRED EMBODIMENT

Figure 1:
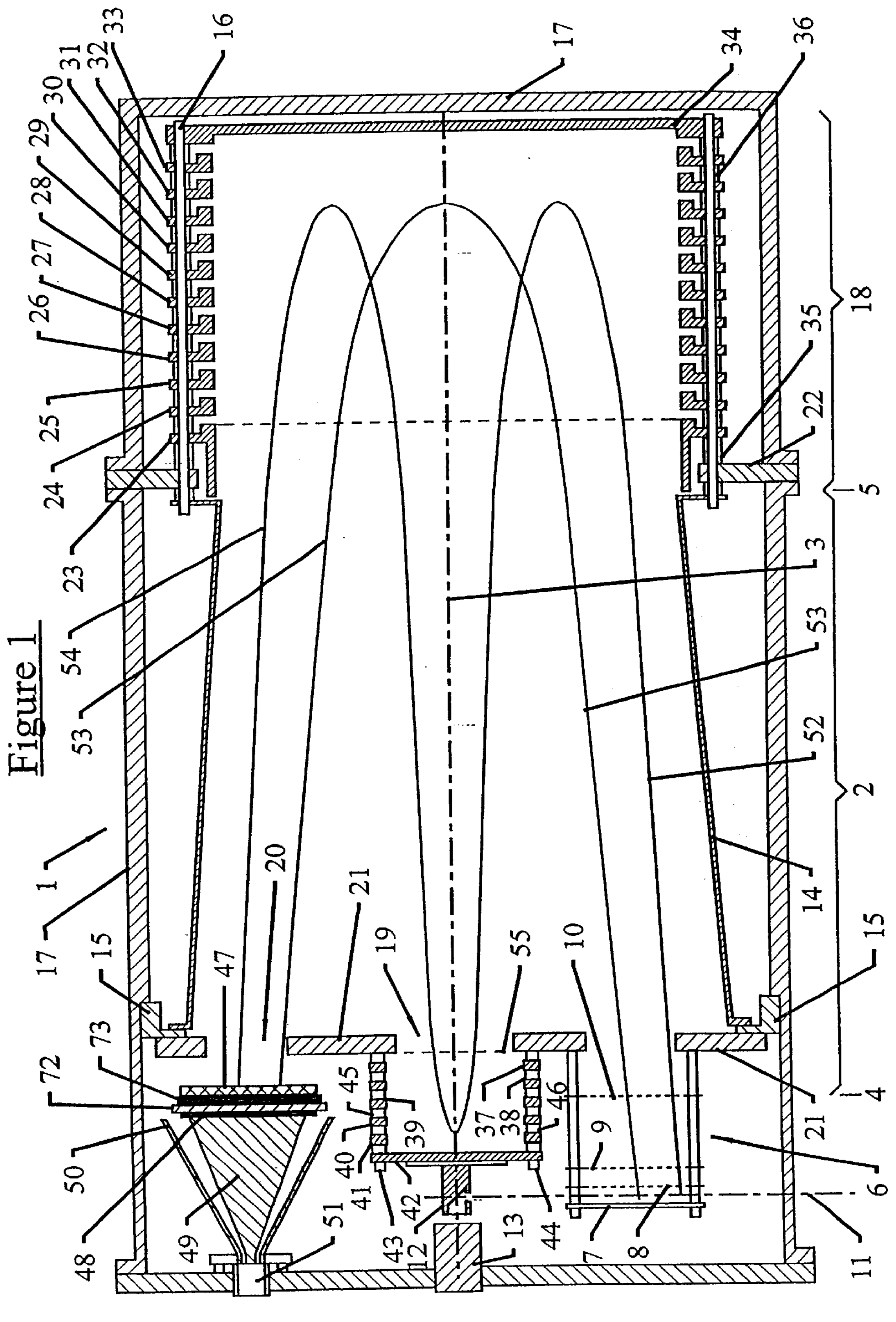
FIG. 1 is a schematic drawing of a time-of-flight mass analyzer according to the invention.

Referring first to FIG. 1, a time-of-flight mass analyzer generally indicated by 1 comprises a drift region 2 having an axis 3, an entrance 4 and an exit 5. An ion-packet generator 6 comprises a pusher electrode 7 and three extraction grids 8, 9 and 10. A first ion reflector 18 is disposed downstream of the exit 5, and a second ion reflector 19 is disposed at the entrance 4. An ion detector 20 is also disposed at the entrance 4, as shown. The analyzer is enclosed in a vacuum housing (shown schematically at 17) and maintained at a pressure of $10^{-6}$ torr or less by a suitable pumping system (not shown). A beam of ions whose mass-to-charge ratio is to be determined enters the ion-packet generator 6 along a beam axis 11 and passes between the pusher electrode 7 and the first extraction grid 8. A beam collection electrode 12 receives ions that are not injected into the drift region by the ion packet generator 6, and deflects them into an auxiliary ion detector 13. The detector may be used to monitor the incoming ion beam and to adjust the apparatus used to generate that beam without using the time-of-flight analyzer itself.

The drift region 2 is enclosed by a conductive flight tube 14. This is mounted at the entrance 4 of the drift region 2 from an insulating flange 15 that is fitted into a recess in the vacuum housing 17. A conductive flange 21, maintained at the same potential as the flight tube 14, is also attached to the flange 15. At the exit 5, the end of the flight tube 14 is supported from a flange 22 by ceramic rods 16 that form part of the first ion reflector 18. The first ion reflector 18 comprises 11 annular electrodes 23–33 and a rear reflector electrode 34, all supported on the ceramic rods 16 and spaced apart by tubular ceramic insulators (eg, 35 and 36). Electrode 23 additionally comprises a fine mesh entrance grid, represented by a dashed line in FIG. 1.

The second ion reflector 19 comprises five annular reflector electrodes 37–41 and a rear reflector electrode 42, each mounted on ceramic rods 43, 44 and spaced apart by tubular insulators 46. A fine mesh entrance grid 55, attached to the flange 21, is also provided. The ion detector 20 comprises two microchannel plate electron multiplier plates 47 in series. A collector electrode 73 is disposed behind the multiplier plates 47 to receive the secondary electrons generated by the multiplier plates 47 and is capacitively coupled to a plate electrode 48. The dielectric material of the capacitor formed by electrodes 73 and 48 is a polyimide film 72 that is capable of providing electrical isolation to at least 8 KV. A 50-ohm transmission line comprising a solid inner conical member 49 and an outer conical member 50 are used to connect the electrode 48 to a RF coaxial connector 51 mounted on the vacuum housing 17. Accurate impedance matching of the electrical connection to the collector electrode 48 is important because the frequency response of the detector and its associated electronics must be in the GHz region to allow the time-of-flight analyzer to operate at maximum sensitivity and resolution. The electrical insulation provided by the film 72 allows the detector to respond to both positive and negative ions. In order to detect negative ions it is necessary to maintain the electrode 73 at a high potential, and the presence of the film 72 allows the conical member 49 and the connector 51 to be maintained at ground potential. This facilitates the connection of the ion detector signal processing equipment while maintaining the required potential difference across the microchannel plates 48. It will be appreciated that the ion detector 20, first reflector 18, drift region 2 and the ion-packet generator 6 are conventional components of prior orthogonal acceleration mass analyzers and need not be described in detail.

Figure 2:
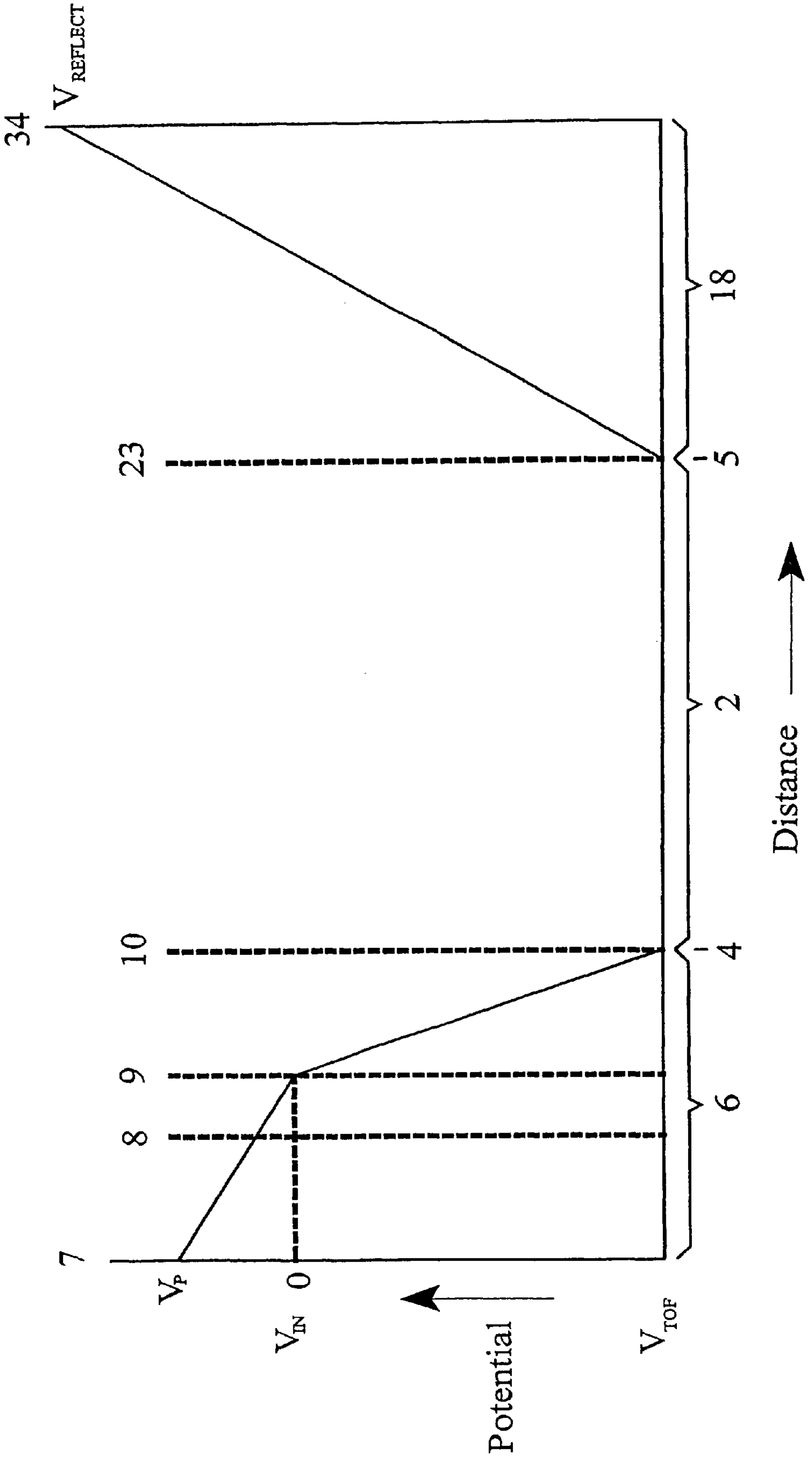
FIG. 2 is a graph showing the potentials applied to various electrodes in a time-of-flight analyzer according to the invention.

Referring next to FIG. 2, ions entering the ion-packet generator 6 do so between the pusher electrode 7 and the first extractor grid 8 at a potential $V_{IN}$, which is typically a few volts removed from ground potential. The pusher electrode 7 and extractor grids 8 and 9 are maintained at the potential $V_{IN}$. The extractor grid 10 and the flight tube 14 are maintained at a high potential $V_{TOF}$, which is typically −9 kV for use with positive ions, and +9 kV for use with negative ions. The grid 23 at the entrance of the first ion reflector 18 is also maintained at $V_{TOF}$, ensuring that the drift region 2 remains field free. The ion reflector electrodes 24–23 and the rear reflector electrode 34 are maintained at a series of potentials between $V_{TOF}$ and $V_{REFLECT}$ as indicated in FIG. 2. $V_{REFLECT}$ is typically about 2.5 kV higher than $V_{IN}$ (i.e. +2.5 kV for positive ions, −2.5 kV for negative ions).

Consequently, ions entering the first ion reflector 18 are reflected before they strike the rear reflector electrode 34, as shown by the trajectories 52–54 (FIG. 1). The entrance of the ion detector microchannel plates 48 is maintained at the flight tube potential $V_{TOF}$. In order to inject a packet of ions into the drift region, the potential of the pusher electrode 7 is momentarily raised to $V_p$ (typically about 1.5 kV higher than $V_{IN}$) and the potential of the extraction grid 8 is simultaneously set to an intermediate value such that an approximately linear potential gradient is generated in the ion-packet generator 6.

Application of this ion ejection pulse causes the ions comprised in the segment of the ion beam present inside the ion-packet generator 6 to be injected into the drift region 2 at the entrance 4. When the angle of inclination between the initial direction of the trajectory 53 and the axis 3 of the drift region 2 is sufficiently large, this packet of ions travels through the drift region 2 along trajectory 53 and is reflected by the first ion reflector 18 back through the drift region 2 to reach the ion detector 20. During their transit through the drift region 2 the ions comprised in the packet separate according to their mass-to-charge ratios so that the lightest ions (having high velocities) reach the detector in advance of the heavier ions. A mass spectrum can therefore be recorded by measuring the time of arrival of the ions at the detector. This mode of operation (ie, with only two passes through the drift region and no reflections at the second ion reflector (n=0)) is similar to a prior conventional prior orthogonal acceleration time-of-flight analyzer fitted with a conventional single-reflection drift region (ie, a reflectron analyzer), for example that taught in GB patent application GB 2233149 A. It will be appreciated that the position of the various electrodes and the potentials applied to them may be adjusted to provide spatial and velocity focusing in this mode of operation, exactly as they would be in a similar prior type of analyzer.

The present invention, however, additionally incorporates a second ion reflector 19 (FIG. 1) which is used when greater resolution is required. When the angle of inclination between the initial direction of the trajectory 52 is lower than that required for the n=0 mode, the ions leaving the ion-packet generator 6 along trajectory 52 and as shown in FIG. 2, are reflected by the first ion reflector 18 into the second ion reflector 19. This in turn reflects them back into the drift region 2 along the trajectory 54 to the first ion reflector 18. Reflector 18 then returns them through the drift region 2 to the ion detector 20. In this mode of operation, therefore, the ions make four passes through the drift region 2 and undergo a single reflection at the second ion reflector (i.e., n=1).

Consequently, higher mass resolution is achievable (because the path through the drift region is twice as long), although the sensitivity is reduced because of the greater number of reflections. It will be appreciated that very few additional components are required to implement the invention. The potential difference between the rear reflector electrode 42 of the second ion reflector 19 and its first reflecting electrode 55 may be the same as that applied across the first ion reflector 18 because they both reflect ions having the same kinetic energy. Consequently, the same high voltage power supply can be used to supply both reflectors. Other than the provision of the second reflector 19 itself, no other major components are required to modify a conventional orthogonal reflection type analyzer to a selectable resolution analyzer according to the invention.

Figure 5:
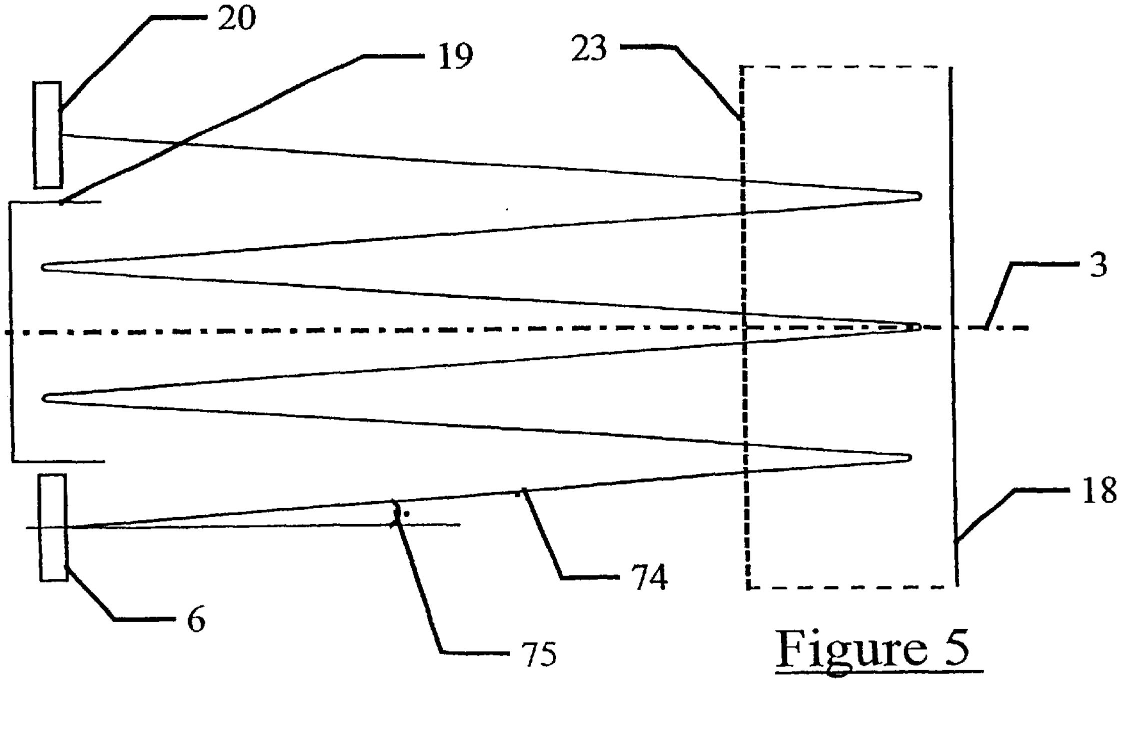
FIG. 5 is a drawing showing the trajectory of ion packets in a time-of-flight analyzer according to the invention operated with high resolution.

FIG. 5 illustrates the ion trajectories in a still higher resolution mode of operation, in which the ions make six passes through the drift region. In this mode the initial direction 74 at which the ions enter the drift region 2 is inclined at an angle 75 which is low enough to ensure that the ions are reflected twice by the second ion reflector 19 and three times by the first ion reflector 18, before they enter the ion detector 20 (i.e., n=2). The trajectory of the ions in this mode may be compared with the trajectories 54 and 53 shown in FIG. 1 four-pass and two-pass modes, respectively.

The second ion reflector 19 is smaller and simpler in construction than the first ion reflector 18 because it needs only to reflect the ion packets. In contrast, the first reflector 18 must also provide spatial focusing. In a reflecting analyzer of this type, the beam of ions travelling along the beam axis 11 is of significant width relative to the distance between the pusher electrode 7 and the extractor grid 9. Consequently, ions starting from different positions on either side of the axis 11 will be accelerated through different potential gradients when the extraction pulse is applied ($V_p$, FIG. 2). Unless properly compensated, this effect seriously reduces mass resolution. However, the first reflector 18 can be arranged to compensate the effect if its potential gradient is properly selected. The reflector is arranged to provide spatial focusing so that ions of a given mass-to-charge ratio having greater than average kinetic energy travel further into the reflector before being turned around and arrive back at the entrance 4 of the drift region at exactly the same time as ions having lower energies. Ions of lower energy travel less far into the reflector before being turned around. Spatial focusing is achieved when the greater distance travelled by the fast ions exactly compensates the excess energy they acquired by virtue of their displaced starting position in the ejection field in the ion-packet generator. It will be appreciated that in the four- and six-pass modes of operation, spatial focusing is achieved for the first two passes of the ions through the drift region and again for passes 3 and 4, (and 5 and 6, if present), on account of the reflections at the first ion reflector 18. Consequently, the second ion reflector 19 is not required to provide spatial focusing and may therefore be uncritical in construction and size. This effect greatly facilitates construction of an analyzer according to the invention, allowing the second ion reflector 19 to be small enough to be fitted between the ion-packet generator and the ion detector 20 in an analyzer optimized for two-pass operation (ie, the second mode), without affecting performance in that mode. For optimum spatial focusing, the second ion reflector should be disposed in the same plane as the ion packet generator 6 and detector 20, as shown in FIG. 1.

Figure 3:
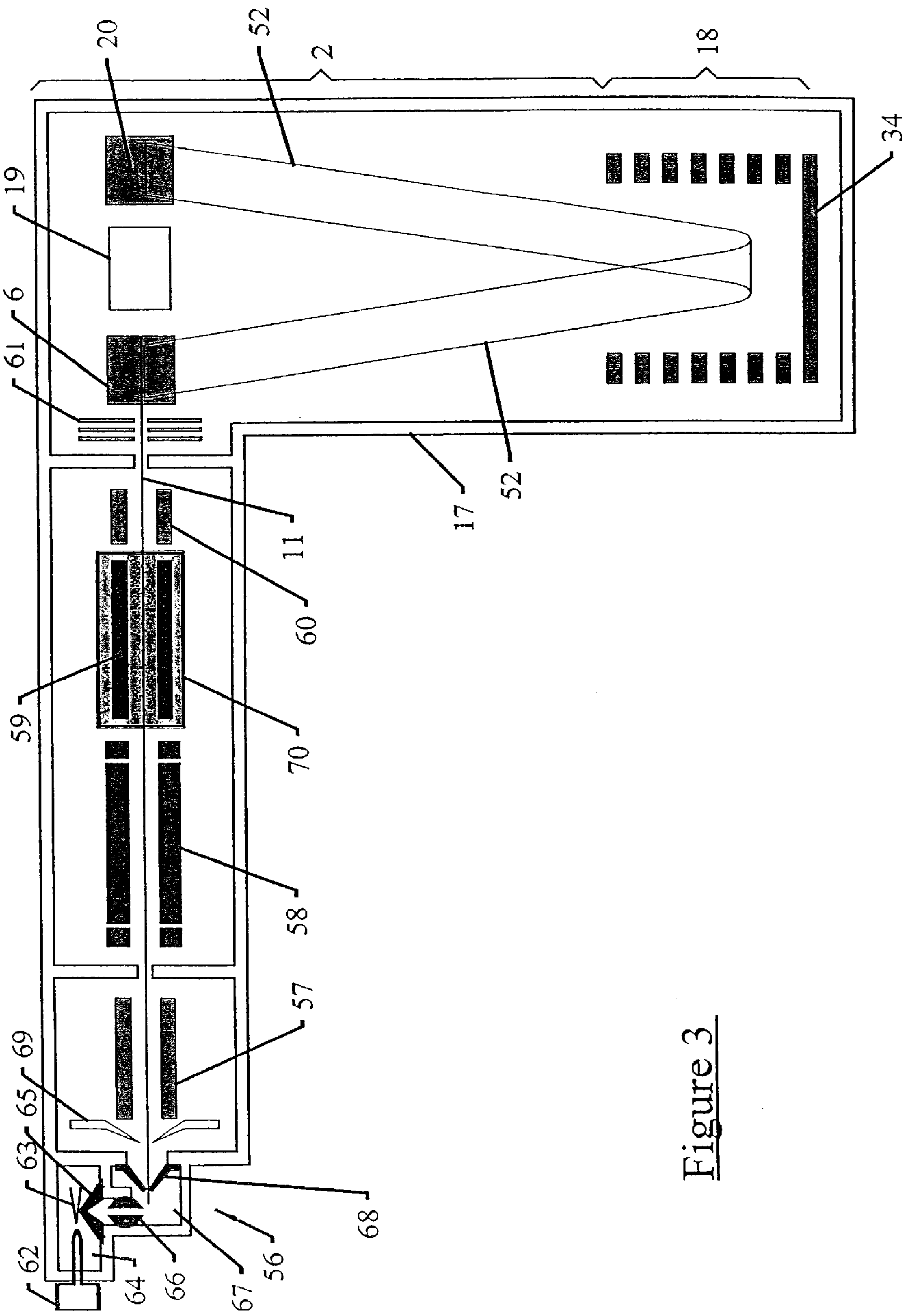
FIG. 3 is a schematic drawing of a tandem mass spectrometer according to the invention.

Referring next to FIG. 3, a tandem mass spectrometer according to the invention comprises an atmospheric pressure ionization source generally indicated by 56, a first multi-polar ion guide 57, a quadrupole mass analyzer 58, a multi-polar collision cell 59 and second multi-polar ion guide 60. An electrostatic lens 61 is provided to transmit ions leaving the ion guide 60 into the ion packet generator 6 of a time-of-flight analyzer of the type described above. A tandem mass spectrometer comprising the components 56–61 and a conventional prior type of time-of-flight mass analyzer downstream of the electrostatic lens 61 is commercially available from Micromass UK Ltd as the "Q-TOF" mass spectrometer. Only a brief description of the construction and method of operation of the components 56–61 is therefore necessary.

A solution containing a sample to be analyzed is introduced into a capillary tube comprised in a sample introduction probe 62 to produce an aerosol 63 at atmospheric pressure in the chamber 64. Ions in the aerosol 63 are sampled through a nozzle 65 and pass through an isolation valve 66 into an evacuated chamber 67, from which they pass through nozzles 68 and 69 to the ion guide 57. Ion guide 57 collimates and thermalizes the ions and transmits them in turn to the quadrupole mass analyzer 58 which allows ions of a predetermined range of mass-to-charge ratios to reach the multi-polar collision cell 59. Here, at least some of the ions transmitted from the first quadrupole analyzer 58 may be fragmented by collisions with inert gas molecules. An enclosure 70 surrounds the cell 59 to maintain the pressure of inert gas introduced into it in the range $10^{-3}$ to $10^{-2}$ torr. A second multi-polar ion guide 60 then transmits the ions emerging from the collision cell 59 through the lens 61 into the ion packet generator 6 of a time-of-flight analyzer of the type illustrated in FIG. 1.

It will be appreciated that the spectrometer of FIG. 3 can be used without fragmenting ions in the collision cell 59 by operating the cell 59 as an ion guide without introducing an inert gas. A beam of unfragmented ions may then be transmitted directly to the ion packet generator 6. Mass analyzer 58 may of course be set to transmit ions of any desired mass range to the ion-packet generator 6.

It is also within the scope of the invention to omit the quadrupole mass analyzer 58, collision cell 59 and second ion guide 60 so that the first ion guide 57 transmits the ions from the ionization source 56 directly to the lens 61, thereby providing a mass spectrometer having only the time-of-flight analyzer. In such an instrument the ion guide 58 should be operated at a sufficient pressure (about $10^{-2}$ torr) to ensure that the ions entering the ion packet generator 6 are adequately thermalized.

Figure 4:
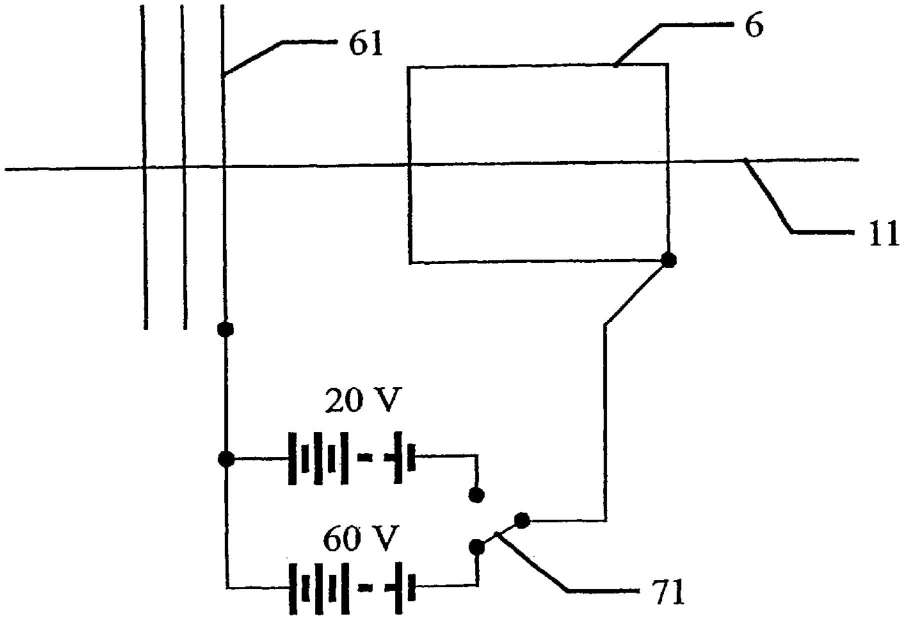
FIG. 4 is a circuit showing how the mode of operation of the spectrometer of FIG. 1 may be selected.

As explained in general terms above, the mode of operation of the time-of-flight analyzer incorporated in the spectrometer of FIG. 3 (i.e., the value of n ) is determined by the initial direction relative to the axis 3 (FIG. 1) in which packets of ions leave the ion packet generator 6. This initial direction is the resultant of the electrostatic field applied to the ions in the ion packet generator to inject them into the drift region entrance 4 and their original kinetic energy along the beam axis 11. The ion guide 57 and/or the collision cell 59 and ion guide 60 produce a highly collimated ion beam along the axis 11 in which the ions have a very small spread in energy. The initial direction at which the packets leave the ion packet generator 6, and hence value of n, may therefore be determined by setting the energy at which the ions enter the ion packet generator 6. In the spectrometer of FIG. 3 this is done by maintaining a suitable accelerating potential between the last element of the electrostatic lens 61 and the ion packet generator 6, as shown in FIG. 4. Thus, if a first potential (typically about −20 V) is selected by the switch 71 (FIG. 4), ions enter the packet generator 6 with approximately 20 eV energy. A potential difference of approximately 11 kV is maintained between the grid 9 and grid 10 and the flight tube 14 ($V_{TOF}$, FIG. 2), and the potential difference between electrodes 23 and 34 of the first ion reflector 18 is maintained at approximately 13.5 kV ($V_{REFLECT}$, FIG. 2). As explained, ion packets are injected by raising the potential of the pusher electrode 7 above that of the grid 9 by $V_p$ (FIG. 2) and the grid 8 to an intermediate value. Typically, $V_p$ is approximately 1.5 kV. Under these conditions, ion packets leave the ion packet generator 6 in directions exemplified by 52 (FIG. 1) and are reflected first by the first ion reflector 18, then by the second ion reflector 19. They then follow trajectories exemplified by 54 to be reflected a second time by the first ion reflector 18 and finally arrive at the ion detector 20 having made four passes through the drift region 2. In this mode of operation (n=1), under the conditions specified a mass resolution of some 30,000 is typical for a drift region approximately 0.5 m long.

In order to operate the mass analyzer with n=0, the switch 71 is set to apply approximately −60 volts between the lens 61 and the ion-packet generator 6. The greater kinetic energy then possessed by the ions causes the ion packets to exit from the ion-packet generator 6 along trajectories exemplified by 53. These trajectories are inclined at a steeper angle to the drift region axis 3 than the trajectories 52 because of the greater component of velocity possessed by the ions in a direction perpendicular to the axis 3. Consequently, on reflection by the first ion mirror 18 they are returned directly to the detector 20, making only two passes through the drift region 2. In this mode, a mass resolution of 15,000 is typical for a drift region length of 0.5 m. However, the sensitivity of the spectrometer is typically about a factor of 5 times higher when operated in the n=0 mode than it is when operated in the n=1 mode, because of the greater number of reflections involved in the n=1 mode. Each reflection typically results in a loss of between 10% and 50% of the ions.

Operation of the analyzer with n=2 may be achieved by applying approximately −10 volts between the lens 61 and the ion packet generator 6, as shown in FIG. 5. This results in a lower angle of inclination between the initial direction of the ions and the axis 3, resulting in six passes through the drift region. A resolution of 40,000 may be achieved in this mode, but at sensitivity perhaps only 10% of that in the n=0 mode.

It will be appreciated that it is typically necessary to provide only two of the three modes of operation in any particular instrument. Usually, the provided modes will include the conventional (n=0) mode for maximum sensitivity, and whichever of the n=1 or n=2 modes is deemed most appropriate. However, it is also within the scope of the invention to provide only modes in which n>0. This is appropriate in the case of instruments where sensitivity may be sacrificed to permit the ,use of a shorter drift region for a given resolution, for example in portable, miniaturized or even microfabricated analyzers.

In practice, best results are obtained by adjusting the $V_p$ and $V_{TOF}$ voltages (FIG. 2) as well as the energy of the incoming ions when changing between the two modes. Typical figures for the n=0 mode of operation are $V_p$=+1.5 kV and $V_{TOF}$=−9 kV. These adjustments ensure optimum spatial focusing in all modes of operation, but are essential only in high-performance analyzer.

As explained previously, the power supply that supplies the $V_{REFLECT}$ voltage for the first ion reflector 18 can also be used to supply the second ion reflector 19. It will be appreciated, therefore, that the invention provides a very simple way of providing a compact switchable resolution time-of-flight mass analyzer involving merely the switching of a single low potential (and optionally two other potentials in the case of a high-performance analyzer), which is cheaper to manufacture than any prior multiple-reflection time-of-flight spectrometer.

What is claimed is:

1. A time-of-flight mass analyzer comprising:

a) a drift region having an axis, an entrance and an exit;

b) an ion packet generator for injecting packets of ions into said drift region at said entrance from a beam of ions by intermittent application of an electrostatic field such that said packets of ions enter said drift region in an initial direction which is inclined to the direction of said beam of ions;

c) a first ion reflector disposed at said exit to reflect back towards said entrance packets of ions which are travelling towards said first ion reflector in said drift region, with ions in each of said packets being temporally separated according to their mass-to-charge ratios while travelling through said drift region;

d) a second ion reflector disposed in juxtaposition to said first ion reflector to reflect back towards said first ion reflector packets of ions which are travelling in said drift region towards said second ion reflector through at least a portion of said drift region, so that the packets of ions may be reflected to and fro between said first and said second ion reflectors and undergo a number n of reflections at said second ion reflector; and e) at least one ion detector disposed to detect at least some of the ions reflected by said first ion reflector which do not enter said second ion reflector, wherein the number n of reflections at said second ion reflector is selected by adjustment of an inclination of said initial direction to said axis.

2. The time-of-flight analyzer according to claim 1 wherein said at least one ion detector is disposed in a common plane with the ion packet generator, and said common plane is perpendicular to the axis of the drift region.

3. The time-of-flight analyzer according to claim 2 wherein said common plane is disposed at the entrance of said drift region.

4. The time-of-flight analyzer according to claim 1 wherein said second ion reflector is disposed between said at least one ion detector and the ion packet generator.

5. The time-of-flight analyzer according to claim 2 wherein said second ion reflector is disposed between said at least one ion detector and the ion packet generator.

6. The time-of-flight analyzer according to claim 1 having at least two modes of operation, a first, low resolution, mode wherein n has a low value and a second, high resolution, mode wherein n has a higher value than in said first mode, and means are provided for selecting one of the at least two modes by adjustment of the inclination of the initial direction at which the ions enter the drift region relative to the axis.

7. The time-of-flight analyzer according to claim 1, wherein said ion packet generator intermittently applies an electrostatic field approximately orthogonally to the direction of said beam of ions in order to generate said packets of ions.

8. The time-of-flight analyzer according to claim 6, wherein said ion packet generator intermittently applies an electrostatic field approximately orthogonally to the direction of said beam of ions in order to generate said packets of ions.

9. The time-of-flight analyzer according to claim 8 wherein said means for selecting the mode comprises setting a ratio of an initial energy at which the ions in the beam of ions enter the ion packet generator to the orthogonal energy imparted to the ions by said electrostatic field to a value which results in the desired value of n.

10. The time-of-flight analyzer according to claim 9 wherein the value of n is selected by adjustment of the initial energy at which the ions enter the ion packet generator.

11. The time-of-flight analyzer according to claim 10 wherein said electrostatic field is maintained substantially constant.

12. The time-of-flight analyzer according to claim 9 wherein the initial energy at which the ions enter the ion packet generator is determined by their passage through a potential gradient, and the value of n is selected by adjustment of the potential difference used to establish said potential gradient.

13. The time-of-flight mass analyzer according to claim 6 wherein an ion-energy collimating device is disposed upstream of said ion packet generator, said ion-energy collimating device being selected from the group consisting of a collisional focusing gas cell and an electrostatic ion-energy filter.

14. The time-of-flight mass analyzer according to claim 10 wherein an ion-energy collimating device is disposed upstream of said ion packet generator, said ion-energy collimating device being selected from the group consisting of a collisional focusing gas cell and an electrostatic ion-energy filter.

15. A mass spectrometer comprising:

a) an ion source;

b) a collisional focusing gas cell for collimating ions generated by said ion source and equalizing their kinetic energies;

c) a drift region having an axis, an entrance and an exit;

d) an ion packet generator for injecting packets of ions into said drift region at said entrance from a beam of ions by intermittent application of an electrostatic field such that said packets of ions enter said drift region in an initial direction which is inclined to the direction of said beam of ions;

e) a first ion reflector disposed at said exit to reflect back towards said entrance packets of ions which are travelling towards said first ion reflector in said drift region, with ions in each of said packets being temporally separated according to their mass-to-charge ratios while travelling through said drift region;

f) a second ion reflector disposed in juxtaposition to said first ion reflector to reflect back towards said first ion reflector packets of ions which are travelling in said drift region towards said second ion reflector through at least a portion of said drift region, so that the packets of ions may be reflected to and fro between said first and said second ion reflectors and undergo a number n of reflections at said second ion reflector; and g) at least one ion detector disposed to detect at least some of the ions reflected by said first ion reflector which do not enter said second ion reflector, wherein the number n of reflections at said second ion reflector is selected by adjustment of an inclination of said initial direction to said axis.

16. The mass spectrometer according to claim 15, having at least two modes of operation, a first, low resolution, mode wherein n has a low value and a second, high resolution, mode wherein n has a higher value than in said first mode, and means are provided for selecting one of the at least two modes by adjustment of the inclination of the initial direction at which the ions enter the drift region relative to the axis.

17. The mass spectrometer according to claim 16, wherein said ion packet generator intermittently applies an electrostatic field approximately orthogonally to the direction of said beam of ions in order to generate said packets of ions and wherein said means for selecting the one of at least two modes comprises setting the ratio of the initial energy at which the ions enter the ion packet generator to the orthogonal energy imparted to the ions by said electrostatic field to a value which results in the desired value of n.

18. The mass spectrometer according to claim 17 wherein the value of n is selected by adjustment of the initial energy at which the ions enter the ion packet generator.

19. The mass spectrometer according to claim 18 wherein the initial energy at which the ions enter the ion packet generator is determined by passage of the ions through a potential gradient downstream of said collisional focusing gas cell, and the value of n is selected by adjustment of the potential difference used to establish said potential gradient.

20. A tandem mass spectrometer comprising:

a) an ion source;

b) a first mass filter for transmitting ions having mass-to-charge ratios in a predetermined range;

c) a collisional focusing gas cell for receiving ions transmitted by said first mass filter, fragmenting the ions by collisions with neutral molecules of gas, collimating said fragmented ions and equalizing kinetic energies of the fragmented ions;

d) a drift region having an axis, an entrance and an exit;

e) an ion packet generator for injecting packets of ions into said drift region at said entrance from a beam of ions by intermittent application of an electrostatic field such that said packets of ions enter said drift region in an initial direction which is inclined to the direction of said beam of ions;

f) a first ion reflector disposed at said exit to reflect back towards said entrance packets of ions which are travelling towards said first ion reflector in said drift region, with ions in each of said packets being temporally separated according to their mass-to-charge ratios while travelling through said drift region;

g) a second ion reflector disposed in juxtaposition to said first ion reflector to reflect back towards said first ion reflector packets of ions which are travelling in said drift region towards said second ion reflector through at least a portion of said drift region, so that the packets of ions may be reflected to and fro between said first and said second ion reflectors and undergo a number n of reflections at said second ion reflector; and h) at least one ion detector disposed to detect at least some of the ions reflected by said first ion reflector which do not enter said second ion reflector wherein the number n of reflections at said second ion reflector is selected by adjustment of an inclination of said initial direction to said axis.

21. The tandem mass spectrometer according to claim 20 wherein said first mass filter comprises a quadrupole mass analyzer.

22. The tandem mass spectrometer according to claim 20 wherein said first mass filter comprises a quadrupole ion trap.

23. The tandem mass spectrometer according to claim 20, having at least two modes of operation, a first, low resolution, mode wherein n has a low value and a second, high resolution, mode wherein n has a higher value than in said first mode, and means are provided for selecting one of the at least two modes by adjustment of the inclination of the initial direction at which the ions enter the drift region relative to its axis.

24. The tandem mass spectrometer according to claim 20, wherein said ion packet generator intermittently applies an electrostatic field approximately orthogonally to the direction of the said beam of ions in order to generate said packets of ions and wherein said means for selecting the mode comprises setting a ratio of an initial energy at which the ions enter the ion packet generator to the orthogonal energy imparted to the ions by said electrostatic field to a value which results in the desired value of n.

25. The tandem mass spectrometer according to claim 20 wherein the value of n is selected by adjustment of the initial energy at which the ions enter the ion packet generator.

26. The tandem mass spectrometer according to claim 20 wherein an initial energy at which the ions enter the ion packet generator is determined by their passage through a potential gradient downstream of said collisional focusing gas cell, and the value of n is selected by adjustment of the potential difference used to establish said potential gradient.

27. A method of determining a mass-to-charge ratio of ions in an original direction traveling in a beam by measuring their time-of-flight through a drift region having an axis, an entrance and an exit, said method comprising the followings steps:

1) intermittently applying an electrostatic field to packets of ions in said beam to inject the ions into said drift region at said entrance in an initial direction inclined to the original direction of travel in said beam;

2) when said ions reach said exit, reflecting the ions back into said drift region towards said entrance by means of a first ion reflector;

3) when said ions reach said entrance, reflecting the ions back into said drift region towards said first ion reflector by means of a second ion reflector so that the ions may be reflected to and fro between said first and second ion reflectors and undergo a number n of reflections at said second ion reflector;

4) controlling the number of reflections at said second ion reflector by adjusting the inclination of said initial direction of said axis; and 5) detecting at least some of the ions reflected by said first ion reflector which do not enter said second ion reflector.

28. The method according to claim 27 further comprising the step of selecting between a first, low resolution, mode wherein n has a low value and a second, high resolution, mode wherein n has a higher value than in said first mode, and selecting one of the modes by adjustment of an inclination of the initial direction at which the ions enter the drift region relative to the axis.

29. The method according to claim 28 further comprising the step of selecting the one of the modes by setting a ratio of an initial energy at which the ions in the beam of ions enter the ion packet generator to an orthogonal energy imparted to the ions by said electrostatic field to a value which results in the desired value of n.

30. The method according to claim 29 further comprising the step of selecting the value of n by adjustment of the initial energy at which the ions enter the ion packet generator.

31. The method according to claim 27 further comprising applying the electrostatic field approximately orthogonally to the direction of said beam of ions.

32. The method according to claim 30 further comprising maintaining said electrostatic field substantially constant.

* * * * *